G. E. TITCOMB.
BRAKE MECHANISM.
APPLICATION FILED APR. 3, 1909.
926,625. Patented June 29, 1909.
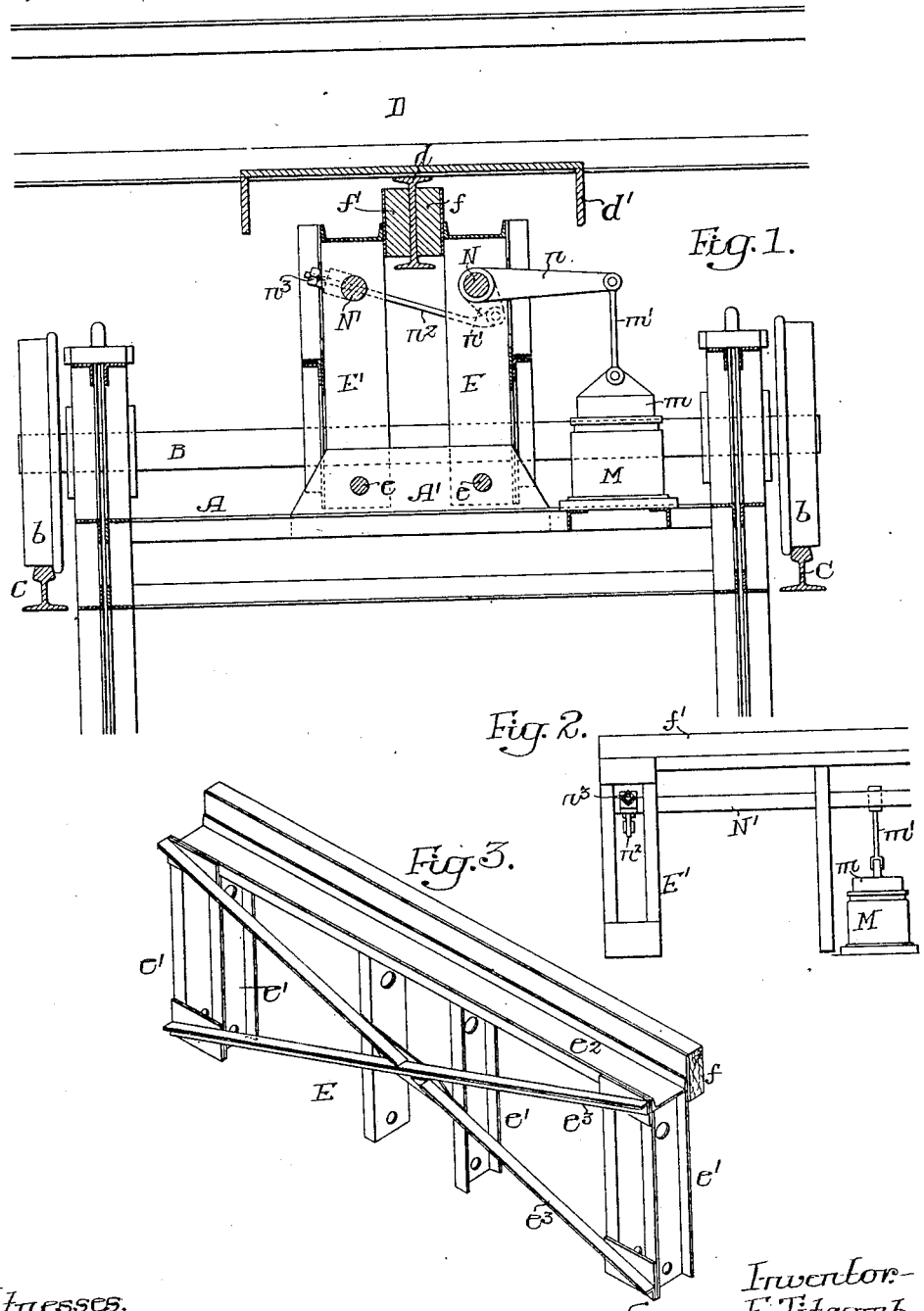
Witnesses.
William H. Rivoir.
Willa A. Burrowes.
Inventor.
George E. Titcomb.
by his Attorneys.

UNITED STATES PATENT OFFICE.

GEORGE E. TITCOMB, OF PHILADELPHIA, PENNSYLVANIA, ASSIGNOR TO THE J. M. DODGE COMPANY, OF NAUGATUCK, CONNECTICUT, A CORPORATION OF CONNECTICUT.

BRAKE MECHANISM.

No. 926,625.     Specification of Letters Patent.     Patented June 29, 1909.

Application filed April 3, 1909. Serial No. 487,617.

*To all whom it may concern:*

Be it known that I, GEORGE E. TITCOMB, a citizen of the United States, residing in Philadelphia, Pennsylvania, have invented certain Improvements in Brake Mechanism, of which the following is a specification.

The object of my invention is to provide a simple and effective brake for overhead trolleys or telphers, the brake mechanism gripping a fixed rail or beam. This object I attain in the following manner, reference being had to the accompanying drawings, in which:—

Figure 1, is a transverse sectional view through an overhead trolley and its supports to illustrate my invention; Fig. 2, is a view of one end of the brake mechanism; and Fig. 3, is a perspective view of one of the brake levers.

A is the frame of the overhead trolley or telpher, having axles B, upon which are mounted the flanged wheels $b$ adapted to overhead tracks C, supported in any suitable manner.

D is an overhead girder, forming either the roof of the building or part of the frame of the structure. There may be as many of these girders as desired, and secured to the underside of the girder is an I-beam $d$.

A', A' are bearings, and pivot pins $e$ are mounted in these bearings and carry the two brake levers E, E', made in the present instance, as clearly illustrated in Fig. 3, of a series of channel bars $e'$ tied together at the top by longitudinal channel bars $e^2$ and trussed by angle irons $e^3$.

The brake shoes $f, f'$ are made of wood in the present instance and are so shaped as to bear upon the opposite sides of the web of the I-beam $d$.

The brake mechanism may be operated by any suitable power, in the present instance I have shown a cylinder M located on the frame A of the trolley, and $m$ is a piston adapted to the cylinder.

$m'$ is a rod connecting the piston with an arm $n$ secured to a rock shaft N carried by the brake lever E. On this rock shaft are two arms $n'$ near each end of the lever E, and these arms are connected by rods $n^2$ to a bar N' on the lever E'; the rods passing through the bar in the present instance and provided with nuts $n^3$, by which the position of the two levers E, E' can be regulated.

The cylinder M is preferably an air cylinder and air under pressure is admitted to the cylinder in any suitable manner, so that when the trolley to telpher A is moved on its rails to any point desired and it is wished to positively hold the trolley in the position to which it is adjusted, air is admitted to the cylinder M and the brake levers E, E' turn on their pivots $e$, causing the shoes $f, f'$ to press hard upon the beam $d$. As these shoes are of considerable length they will hold the trolley in the position to which it is adjusted.

When the overhead structure is in the open then I prefer to use a hood $d'$ to protect the beam $d$ from the weather, as it is desirable to keep the surface of this beam free from dampness or grease.

The type of trolley to which this brake mechanism is particularly adapted is one used in picking up and transferring heavy loads, such as coal or other material, in buckets, and it is essential to lock the trolley in position during the hoisting operation, otherwise the trolley is apt to run on the track when power is applied to lift the bucket, but by using the brake mechanism described above the trolley is positively locked, yet can be readily released so that it can be traversed from one point to another. Furthermore the above brake mechanism overcomes any slipping of the wheels on the rails, due to greasy or wet rails and wheels, so that the apparatus can be operated rapidly and can be stopped quickly at the proper point in all kinds of weather.

I claim:—

1. The combination in brake mechanism for overhead trolleys, of a trolley frame, overhead rails upon which the trolley is mounted, a fixed beam extending parallel with the rail and over the trolley, and brake mechanism carried by the trolley and adapted to bear upon the beam.

2. The combination in a brake mechanism for overhead trolleys, of a trolley frame, overhead tracks upon which the trolley is mounted, a fixed beam, brake levers pivoted to the trolley and adapted to bear upon each side of the beam, with means for moving the two brake levers toward and from the beam.

3. The combination in an overhead trolley, of a trolley frame, rails supporting said frame, a fixed beam, two brake levers pivoted to the trolley adapted to bear against opposite sides of the beam, a rock shaft carried by one of said brake levers, an arm on the rock shaft connected to the other brake lever, a second arm, and means connected with the second arm for actuating the rock shaft so as to move the brake levers toward and from the fixed beam.

4. The combination in an overhead trolley, of rails supporting the trolley, a fixed overhead beam, two brake levers having extended bearing surfaces or shoes adapted to bear against opposite sides of the fixed beam, a rock shaft carried by one of said levers, arms on the rock shaft, rods connecting the arms with the other brake lever and another arm on the rock shaft, a piston connecting said arm and a cylinder in which the piston is mounted, with means for supplying said cylinder with fluid under pressure.

5. The combination in a trolley, having axles and wheels, rails upon which the wheels travel, an overhead I-beam fixed in position and running parallel with the rails of the track, two levers pivotally mounted on the trolley and having wooden shoes resting against either side of the fixed beam, said levers being made up of a series of metal shapes tied together, a cylinder, and means for actuating the brake levers.

6. The combination in a trolley, having axles and wheels, rails upon which the wheels travel, an overhead I-beam fixed in position and running parallel with the rails of the track, two levers pivotally mounted on the trolley and having wooden shoes resting against either side of the fixed beam, said levers being made up of a series of metal shapes tied together, a cylinder, means for supplying said cylinder with fluid under pressure, a piston in said cylinder, a rock shaft having an arm connected to the piston, two arms on said rock shaft, rods connecting said arms with the other brake lever, and means on said arms for adjusting one brake lever in respect to the other.

In testimony whereof, I have signed my name to this specification, in the presence of two subscribing witnesses.

GEORGE E. TITCOMB.

Witnesses:
Wm. E. Shupe,
Wm. A. Barr.